US012770956B2

(12) United States Patent
Hickey et al.

(10) Patent No.: US 12,770,956 B2
(45) Date of Patent: Oct. 20, 2026

(54) 3-SIDED COOLING OF A BATTERY PACK WITH DUAL-FUNCTION COOLING PLATES

(71) Applicant: GM GLOBAL TECHNOLOGY OPERATIONS LLC, Detroit, MI (US)

(72) Inventors: Ryan P. Hickey, Austin, TX (US); Phillip D. Hamelin, Clarkston, MI (US); Alexander M. Bilinski, Avoca, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 722 days.

(21) Appl. No.: 18/177,441

(22) Filed: Mar. 2, 2023

(65) Prior Publication Data

US 2024/0297363 A1 Sep. 5, 2024

(51) Int. Cl.

| | |
|---|---|
| ***H01M 10/50*** | (2006.01) |
| ***H01M 10/613*** | (2014.01) |
| ***H01M 10/653*** | (2014.01) |
| ***H01M 10/6556*** | (2014.01) |

(52) U.S. Cl.

CPC ..... *H01M 10/6556* (2015.04); *H01M 10/613* (2015.04); *H01M 10/653* (2015.04)

(58) Field of Classification Search

CPC ......... H01M 10/6556; H01M 10/6557; H01M 10/6554; H01M 10/6555; H01M 10/6551; H01M 10/613; H01M 10/617; H01M 10/653

See application file for complete search history.

(56) References Cited

U.S. PATENT DOCUMENTS

| | | | | |
|---|---|---|---|---|
| 2017/0110773 | A1* | 4/2017 | Pucher ................ | H01M 10/613 |
| 2018/0147953 | A1 | 5/2018 | Lee et al. | |
| 2018/0175466 | A1 | 6/2018 | Seo et al. | |
| 2019/0198951 | A1 | 6/2019 | Tong et al. | |
| 2022/0102792 | A1 | 3/2022 | Yoo et al. | |

FOREIGN PATENT DOCUMENTS

| | | |
|---|---|---|
| CN | 109980144 A | 7/2019 |

* cited by examiner

*Primary Examiner* — Raymond Alejandro
(74) *Attorney, Agent, or Firm* — Quinn IP Law

(57) ABSTRACT

A dual-function, combined thermal/structural structure for simultaneously holding and cooling one or more battery cells that are stacked inside of a battery pack. The dual-function structure comprises: (1) a first cooling plate with a first plurality of parallel internal coolant channels; (2) a second cooling plate with a second plurality of parallel internal coolant channels; (3) a first structural side plate; (4) a second structural side plate; and (5) fasteners for joining the first cooling plate, the second cooling plate, the first structural side plate, and the second structural side plate together into an rectangular, box-like, cooled structure. The first and second cooling plates simultaneously structurally support and thermally cool one or more battery cells on at least two opposite sides. Additional horizontal cooling plates can be used to thermally cool and structurally support the underside of each battery cell, thereby providing a 3-sided cooling effect.

19 Claims, 11 Drawing Sheets

SEC A-A

3-SIDED COOLING OF A BATTERY PACK WITH DUAL-FUNCTION COOLING PLATES

INTRODUCTION

The present disclosure relates generally to dual-function structures for simultaneously holding and cooling battery packs. More specifically, aspects of this disclosure relate to combined structural and thermal management systems for regulating the operating temperatures of battery cells in rechargeable, multicell battery packs used by electric vehicles or other electrified platforms.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric vehicle" (EV)—is a type of electric-drive vehicle configuration that omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with one or more traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds for desired ranges, contemporary traction battery packs group multiple battery cells (e.g., 8-16+ cells/stack) into individual battery cells (e.g., 10-40+ modules/pack) that are electrically interconnected in series or parallel and securely mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

High-voltage (HV) electrical systems govern the transfer of electricity between the batter pack and the traction motors. The individual cells of a battery pack may generate a significant amount of heat during charging and discharging cycles. This cell-borne heat is produced primarily by exothermic chemical reactions and losses due to activation energy, chemical transport, and resistance to ionic migration. Unfortunately, a series of exothermic and gas-generating reactions may take place within lithium-ion batteries as cell temperatures rise that may push the battery assembly towards an unstable state. Such thermal events, if left unchecked, may lead to a more accelerated heat-generating process called "Thermal Runaway Propagation" (TRP), which is an exothermic condition in which the battery system is unable to return the internal battery components to normal operating temperatures. In other words, a TRP event is a spontaneous internal short circuit within a battery cell that causes a sudden energy release and venting within the battery housing. An integrated battery cooling system may be employed to help prevent these undesirable overheating conditions within such battery packs. Active thermal management (ATM) systems, for example, can employ a central controller or dedicated control module to regulate the operation of a cooling circuit that circulates coolant fluid through the heat-producing battery components. For indirect liquid cooling systems, a heat transfer coolant is circulated through a network of internal channels, plates, and/or pipes located within or directly next to the battery case. In the present disclosure, such cooling plates can also function as structural components that help to secure the battery cells, and to secure the battery pack to the vehicle's body.

SUMMARY

Presented herein are dual-function structural and thermal management systems for simultaneously cooling and structurally supporting battery cells inside of a battery pack. The dual-function structure includes: (1) a first cooling plate with a first plurality of parallel internal coolant channels; (2) a second cooling plate with a second plurality of parallel internal coolant channels; (3) a first structural side plate; (4) a second structural side plate; and (5) fasteners for joining the first cooling plate, the second cooling plate, the first structural side plate, and the second structural side plate together into a rectangular, box-like structure. The first and second cooling plates simultaneously structurally support and thermally cool one or more battery cells on two opposite sides. Additional horizontal cooling beams are used to thermally cool and structurally support the bottom side of each battery cell, thereby providing a 3-sided cooling effect. The phrase "dual-function" refers to structural components that contain actively-cooled internal channels that simultaneously cool the battery cells on three sides and simultaneously structurally secure the battery cells inside of the battery pack.

A first example of a dual-function structure, for simultaneously structurally holding and thermally cooling a battery cell, includes: a first cooling plate including a first plurality of internal coolant channels; a second cooling plate including a second plurality of internal coolant channels; a first structural side plate that is structurally attached to both the first and second cooling plates at proximal ends of the first and second cooling plates; and a second structural side plate that is structurally attached to both the first and second cooling plates at distal ends of the first and second cooling plates; wherein the first cooling plate simultaneously thermally cools and structurally supports a first side of a battery cell; wherein the second cooling plate simultaneously thermally cools and structurally supports a second side of the battery cell; and wherein the first side of the battery cell is located opposite to the second side of the battery cell. The dual-function structure further includes a plurality of fasteners that structurally join the first cooling plate, the second cooling plate, the first structural side plate, and the second structural side plate together into a rectangular, box-like structure. The first structural side plate is oriented at 90 degrees to the first cooling plate; the second structural side plate is oriented at 90 degrees to the second cooling plate; and the first structural side plate is oriented parallel to the second structural side plate.

Referring still to the first example, the dual-function structure also includes a first horizontal support beam; and a second horizontal support beam, which is oriented parallel to the first support beam; wherein the first horizontal support beam is simultaneously thermally connected and structurally attached to a first bottom side of the first cooling plate; wherein the second horizontal support beam is simultaneously thermally connected and structurally attached to a second bottom side of the second cooling plate; and wherein the first and second horizontal support beams structurally support and thermally cool a battery cell on a third, bottom side of the battery cell. The dual-function structure further includes: a first combined thermal/structural joint made between the first cooling plate and the first horizontal support beam; a second combined thermal/structural joint made between the second cooling plate and the second horizontal support beam; a first Thermal Interface Material (TIM) that is disposed inside the first combined thermal/structural joint; and a second Thermal Interface Material (TIM) that is disposed inside the second combined thermal/structural joint.

Referring still to the first example, the first and second cooling plates are made of an extruded aluminum alloy; the first plurality of internal cooling channels are oriented parallel to each other; the second plurality of internal cooling channels are oriented parallel to each other; and the first and second plurality of internal cooling channels have a rectangular cross-sectional shape. The dual-function structure further includes a first integral horizontal channel disposed on a top portion of the first cooling plate; and a second integral horizontal channel disposed on a top portion of the second cooling plate; wherein the first integral horizontal channel includes a first recessed horizontal groove configured to hold a first vertical fastener; wherein the second integral horizontal channel includes a second recessed horizontal groove configured to hold a second vertical fastener; wherein the first integral horizontal channel is open at both ends of the first integral horizontal channel; and wherein the second integral horizontal channel is open at both ends of the second integral horizontal channel. The dual-function structure further includes: a first slidable vertical fastener disposed inside of the first recessed horizontal groove; a second slidable vertical fastener disposed inside of the second recessed horizontal groove; and a hollow structural channel that is structurally attached to both the first and the second slidable vertical fasteners; wherein the hollow structural channel is disposed on top of both the first cooling plate and the second cooling plate; wherein the hollow structural channel is oriented at 90 degrees to both the first cooling plate and the second cooling plate. A first layer of a Thermal Interface Material (TIM) is disposed in between a bottom side of the battery cell and a first horizontal support beam; and a second layer of a Thermal Interface Material (TIM) is disposed in between the bottom side of the battery cell and a second horizontal support beam. A third layer of a Thermal Interface Material (TIM) is disposed in between the first cooling plate and a front side of the battery cell; and a fourth layer of a Thermal Interface Material (TIM) is disposed in between the second cooling plate and a back side of the battery cell.

A second example of a dual-function structure, for simultaneously structurally holding and thermally cooling a battery cell, includes: a first cooling plate including a first plurality of internal coolant channels; a second cooling plate including a second plurality of internal coolant channels; a first structural side plate that is structurally attached to both the first and second cooling plates at proximal ends of the first and second cooling plates; a second structural side plate that is structurally attached to both the first and second cooling plates at distal ends of the first and second cooling plates; a plurality of fasteners that structurally join the first cooling plate, the second cooling plate, the first structural side plate, and the second structural side plate together into a rectangular, dual-function structure; and a battery cell disposed inside of the dual-function structure. The first cooling plate simultaneously thermally cools and structurally supports a first side of the battery cell. The second cooling plate simultaneously thermally cools and structurally supports a second side of the battery cell; wherein the first side of the battery cell is located opposite to the second side of the battery cell. The battery cell is disposed inside of a rectangular opening in the dual-function structure. The dual-function structure is defined on four sides by: (1) the first cooling plate, (2) the first structural side plate, (3) the second cooling plate, and (4) the second structural side plate; and wherein the dual-function structure is also attached to a bottom support plate that is disposed underneath a battery pack. This configuration providing simultaneous three-sided structural support and three-sided thermal cooling of the battery cell.

Referring still to the second example, the first and second cooling plates each have a fluidically-coupled coolant manifold disposed on a distal end of each cooling plate. Coolant initially flows horizontally inside a bottom half of the cooling plate towards the manifold, then turns and flows vertically upwards inside the manifold; at which point the coolant flow reverses direction and flows horizontally away from the manifold inside an upper half of the cooling plate. This innovative coolant flow configuration helps to eliminate any undesirable air bubbles that might be entrained in the coolant when the cooling plates are filled with coolant. The dual-function structure, including the first cooling plate, the second cooling plate, the first structural side plate, and the second structural side plate, is attached to a bottom structural support plate that is located on a bottom surface of the battery pack. The two structural side plates are also attached to a bottom structural plate of the battery pack with a central vertical bolt. The two structural side plates are also attached to both horizontal support beams of battery pack with a pair of vertical bolts. The two structural side plates are attached to the pair of cooling plates with one or more fasteners (for example, three fasteners) that pass through multiple, evenly-spaced horizontal holes that are disposed in each structural side plate.

Additional aspects of this disclosure are directed to motor vehicles with thermal management systems for cooling lithium-class traction battery packs. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, golf carts, off-road and all-terrain vehicles, motorcycles, farm equipment, watercraft, aircraft, e-bikes, etc. For non-automotive applications, disclosed concepts may be implemented for any logically relevant use, including stand-alone power stations and portable power packs, photovoltaic systems, pumping equipment, machine tools, server systems, etc. While not per se limited, disclosed concepts may be particularly advantageous for use with lithium-class prismatic and/or cylindrical battery cells.

The above summary does not represent every example or every aspect of the present disclosure. Rather, the foregoing Summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and sub-combinations of the elements and features presented herein.

DETAILED DESCRIPTION

Figure 1:
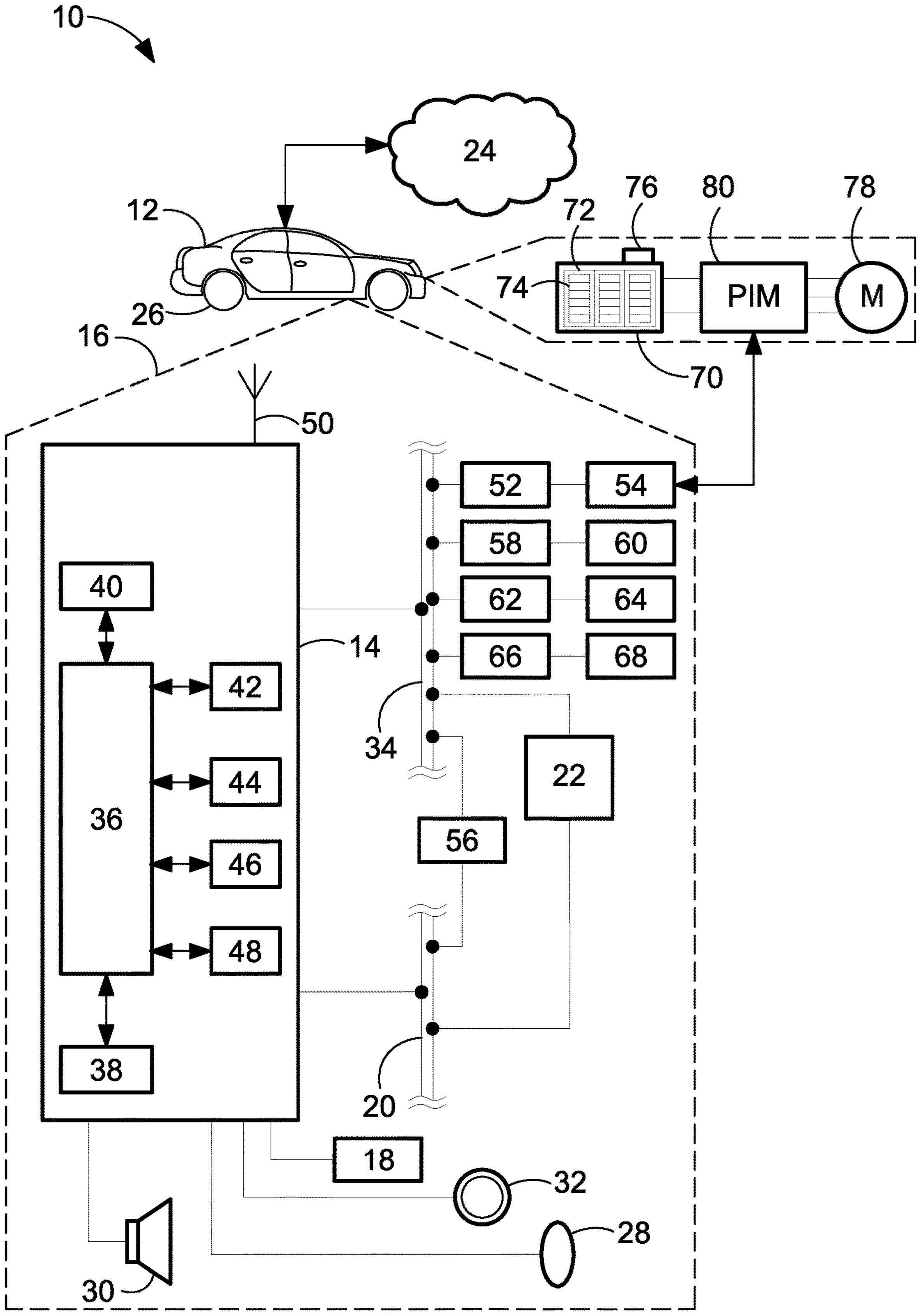
FIG. 1 shows a partially schematic, side-view illustration of a representative motor vehicle with an electrified powertrain, a rechargeable traction battery pack, and a thermal management system for regulating the operating temperatures of battery cells in the battery pack, in accord with aspects of the present disclosure.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and battery assemblies are shown and described in additional detail herein. Nevertheless, the vehicles and assemblies discussed below may include numerous additional and alternative features, and other available peripheral components, for carrying out the various methods and functions of this disclosure. Note that the phrases "cooling plate" and "cold plate" are used interchangeably herein. Also, the phrases "structural plate" and "structural panel" are used interchangeably herein.

The representative vehicle 10 of FIG. 1 is originally equipped with a center stack telecommunications and information ("telematics") unit 14 that wirelessly communicates, e.g., via cell towers, base stations, mobile switching centers, satellite service, etc., with a remotely located cloud computing host service 24 (e.g., ONSTAR®). Some of the other in-vehicle hardware components 16 shown in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with means to input verbal or other auditory commands to the telematics unit 14. Conversely, the speakers 30 provide audible output to a vehicle occupant and may be either a stand-alone speaker dedicated for use with the telematics unit 14 or maybe part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

With continuing reference to FIG. 1, long-range communication (LRC) capabilities with off-board devices may be provided via one or more of a cellular chipset/component, a navigation and location chipset/component (e.g., global positioning system (GPS) transceiver), or a wireless modem, which are collectively represented at item 44. Short-range communication (SRC) may be provided via a close-range wireless communication device 46 (e.g., a BLUETOOTH® unit or near field communications (NFC) transceiver), a dedicated short-range communications (DSRC) component 48, and/or a dual antenna 50. It should be understood that vehicle 10 may be implemented without one or more of the above-listed components or, optionally, may include additional components and functionality as desired for a particular end use. The communications devices described above may provide data exchanges as part of a periodic broadcast in a vehicle-to-vehicle (V2V) communication system or a vehicle-to-everything (V2X) communication system.

With continuing reference to FIG. 1, CPU 36 receives sensor data from one or more sensing devices that use, for example, photo detection, radar, laser, ultrasonic, optical, infrared, or other suitable sensor technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more laser range sensors 64, one or more vehicle speed sensors 66, one or more vehicle dynamics sensors 68, and filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

With continuing reference to FIG. 1, to propel the motor vehicle 10, an electrified powertrain is operable to generate and deliver tractive torque to one or more of the vehicle's drive wheels 26. The powertrain is generally represented in FIG. 1 by an electric traction motor 78 that is operatively connected to a rechargeable energy storage system (RESS), which may be a chassis-mounted traction battery pack 70. The traction battery pack 70 is generally composed of one or more battery cells 72 each containing a group of electrochemical battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Figure 2:
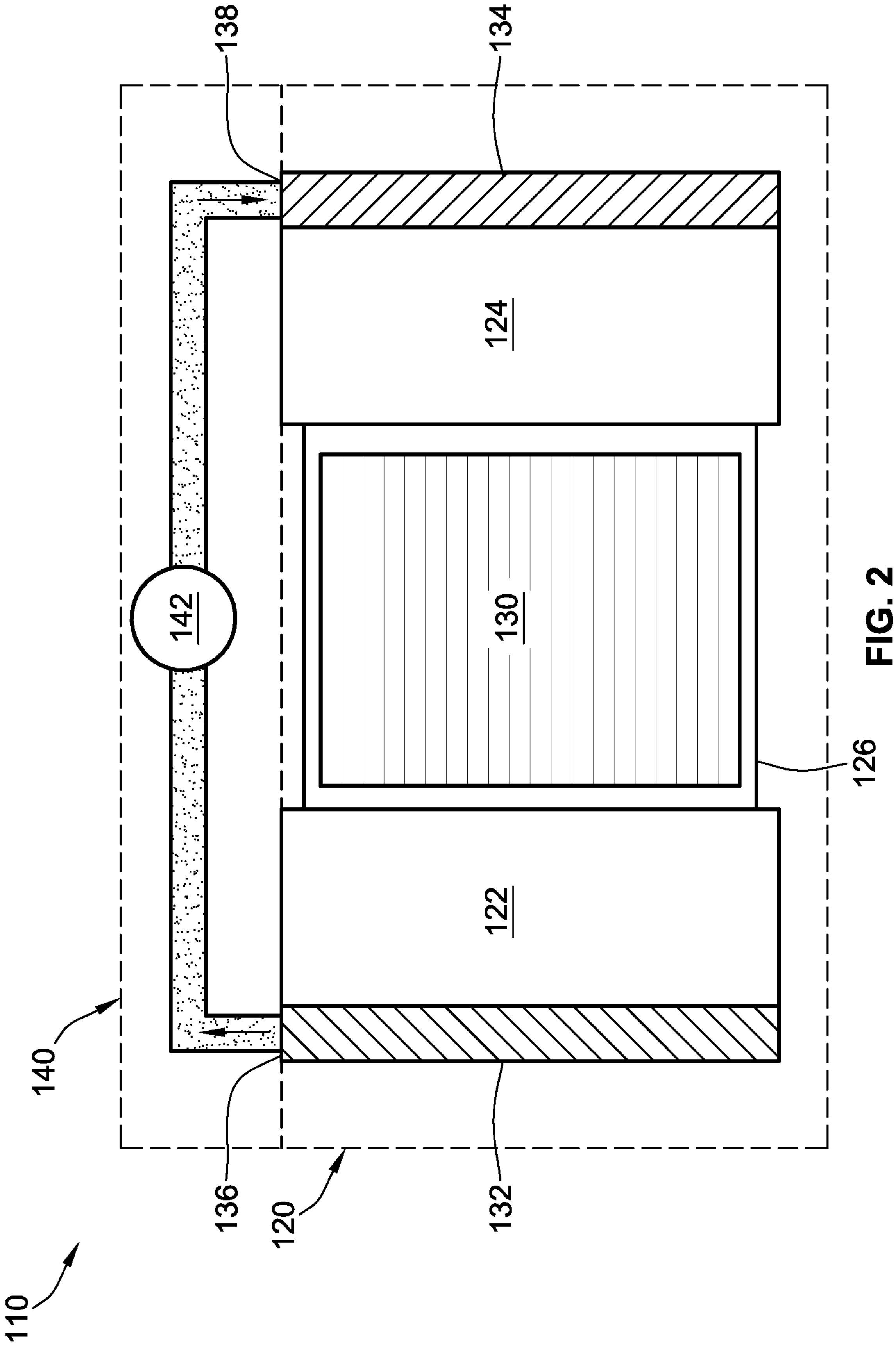
FIG. 2 shows a schematic illustration of a representative electrochemical device with which aspects of the present disclosure may be practiced.

Presented in FIG. 2 is an exemplary electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked and packaged inside a protective outer housing 120. Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. In at least some configurations, the cell housing 120 (or "cell case") may take on a can-like cylindrical construction or a box-like prismatic construction that is formed of aluminum, nickel-plated steel, ABS, PVC, or other suitable material or composite material. The internal and external surfaces of a metallic cell casing 120 may be coated with a polymeric finish to insulate metal from internal cell elements and from adjacent cells. Although FIG. 2 illustrates a single galvanic monocell unit enclosed within the cell housing 120, it should be appreciated that the housing 120 may stow therein a plurality of stacked monocell units (e.g., five to five hundred cells or more).

With continuing reference to FIG. 2, anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio in a range from 0 at. % Li/Al to <70 at. %, and/or aluminum alloys with Al atomic ratio >50 at. % (e.g., lithium metal is smelt). Additional examples of suitable active anode electrode materials include carbonaceous materials (e.g., graphite, hard carbon, soft carbon, etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

With continuing reference to FIG. 2, cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M=Co, Ni, Mn, or combinations thereof); $LiM_2O_4$ (M=Mn, Ti, or combinations thereof), $LiMPO_4$ (M=Fe, Mn, Co, or combinations thereof), and LiMxM'2-xO4 (M, M'=Mn or Ni). Additional non-limiting examples of suitable active cathode electrode materials include lithium nickel cobalt manganese oxide (NCM), lithium nickel cobalt aluminum oxide (NCA), lithium nickel cobalt manganese aluminum oxide (NCMA), and other lithium transition-metal oxides.

With continuing reference to FIG. 2, disposed inside the battery cell housing 120, between each neighboring pair of electrodes 122, 124, is a porous separator 126. The porous separator 126 may be an electrically non-conductive, ion-transporting microporous or nanoporous polymeric separator sheet. Separator 126 may be a sheet-like structure that is composed of a porous polyolefin membrane, e.g., with a porosity of about 35% to about 65% and a thickness of approximately 10-30 microns. Electrically non-conductive ceramic particles (e.g., silica) may be coated onto the porous membrane surfaces of the separators 126. The porous separator 126 may incorporate a non-aqueous fluid electrolyte composition and/or solid electrolyte composition, collectively designated 130, which may also be present in the negative electrode 122 and the positive electrode 124.

With continuing reference to FIG. 2, a negative electrode current collector 132 of the electrochemical battery cell 110 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and electrode tab 136, and to the positive electrode 124, through its respective current collector 134 and electrode tab 138.

With continuing reference to FIG. 2, the porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110. For some configurations, the porous separator 126 may be a microporous polymeric separator including a polyolefin. The polyolefin may be a homopolymer (which is derived from a single monomer constituent), or a heteropolymer (which is derived from more than one monomer constituent (s)) and may be either linear or branched. In a solid-state battery, the role of the separator may be partially/fully provided by a solid electrolyte layer.

With continuing reference to FIG. 2, operating as a rechargeable energy storage system, battery 110 generates electric current that is transmitted to one or more loads 142 operatively connected to the external circuit 140. While the load 142 may generally include electric devices, a few non-limiting examples of power-consuming load devices include: electric motors for hybrid and full-electric vehicles, laptop and tablet computers, cellular smartphones, cordless power tools and appliances, portable power stations, etc. The battery 110 may include a variety of other components that, while not depicted herein for simplicity and brevity, are nonetheless readily available. For instance, battery 110 may include one or more gaskets, terminal caps, tabs, battery terminals, cooling hardware, charging hardware, and/or other commercially available components or materials that may be situated on or in battery 110. Moreover, the size and shape and operating characteristics of the battery 110 may vary depending on the particular application for which it was designed.

Figure 3:
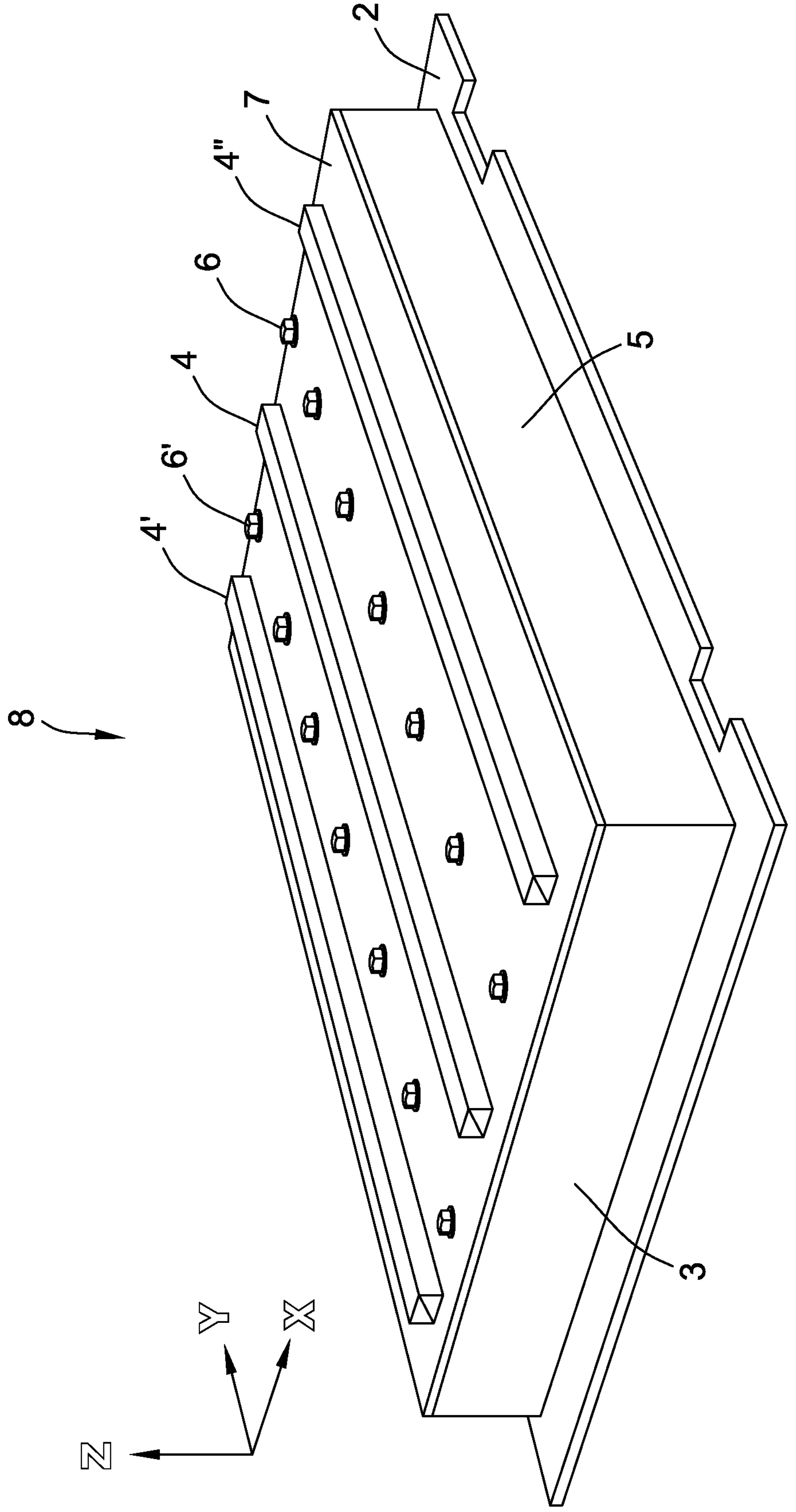
FIG. 3 shows a 3-D perspective schematic view of a representative battery pack, according to aspects of the present disclosure.

FIG. 3 shows a 3-D perspective view of a representative battery pack 8, according to aspects of the present disclosure. Battery pack 8 schematically comprises a simple structural box comprising: a top structural support plate 7, a pair of structural side plates 3 and 5, and a bottom structural support plate 2. Located inside of battery pack 8 is an internal, dual-function structural structure (not shown) comprising a plurality of modular, interconnected thermal/structural components, wherein each individual structure has a rectangular opening sized that securely holds a plurality of battery cells (not shown) stacked side-by-side. See FIG. 10 for more details. The battery cells (not shown) can have a prismatic shape (e.g., a rectangular shape). Battery pack 8 can also comprise a plurality of battery cells, battery cells containing multiple battery cells, separator elements, structural plates, cooling plates, attachment bolts, and electrical connectors located inside of battery pack 8. Battery pack 8 further comprises a plurality of vertical structural bolts 6, 6' (e.g., fourteen bolts) spaced uniformly around pack 8 that structurally attach the top support plate 7 to the bottom support plate 2. Battery pack 8 also comprises a plurality of parallel, structural channels 4, 4', 4" (three exemplary square, hollow channels are shown in FIG. 3), which serve to increase the overall bending stiffness of battery pack 8.

Figure 4:
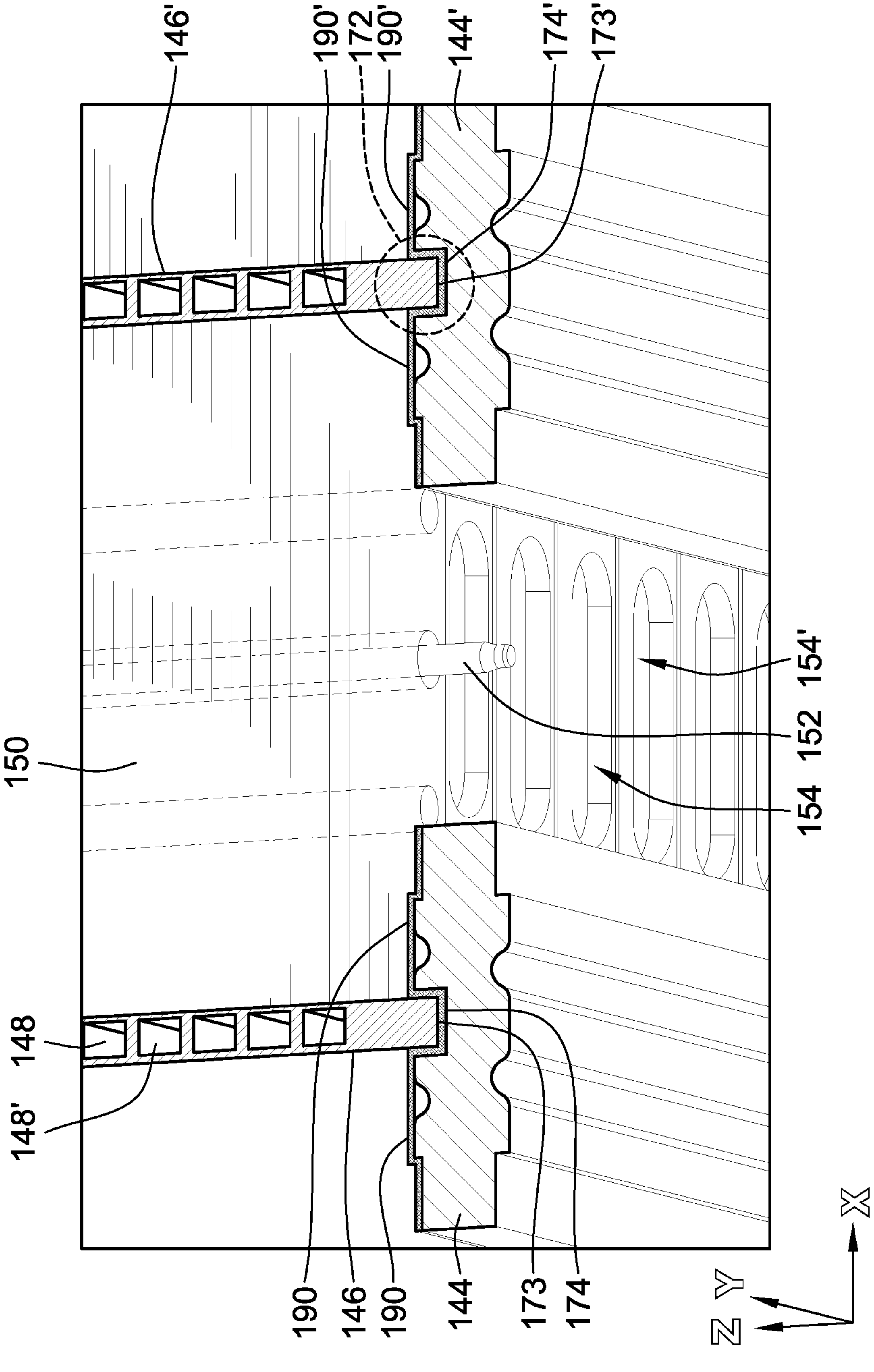
FIG. 4 shows a 3-D perspective cross-sectional view of the underside of an assembled pair of representative cooling plates and structural elements of a representative battery pack, according to aspects of the present disclosure.

FIG. 4 shows a 3-D perspective cross-sectional view of the underside of an assembled pair of representative cooling plates and structural elements of a representative battery pack, according to aspects of the present disclosure. Cooling plate 146 is a hollow plate that comprises a plurality of internal cooling channels 148, 148', etc., which can have a rectangular, square, circular, or oval cross-sectional shape, and/or combinations thereof. The internal cooling channels 148, 148', etc. can be oriented parallel to each other. Cooling plate 146 can be made of a strong metal or metal alloy with a high thermal conductivity, such as aluminum, an aluminum alloy, copper, a copper alloy, or steel and/or combinations thereof. The hollow structure of cooling plate 146 comprising internal cooling channels 148, 148' can be made by extrusion.

Referring still to FIG. 4, the bottom side 172 of cooling plate 146 can be embedded into a rectangular groove 173, 173' disposed in a horizontal support beam 144, 144', respectively, that runs in the "Y"-direction. Cooling plate 146 can be attached to a middle point (not shown) of horizontal support beams 144. The thermal/structural connection of cooling plate 146 to horizontal support beam 144 can be a mechanical interference fit, with or without using a Thermal Interface Material (TIM) 174, 174' disposed in-between cooling plate 146 and horizontal support beam 144. Thermal Interface Material (TIM) 174, 174' can be supplied initially as a liquid or gel that subsequently cures into a solid form that makes a good thermal connection between the cooling plate 146 and a battery cell (which is hidden behind structural side plate 150). An example of a TIM 174, 174' can be a composite material composed of a polymer matrix with a high-volume percent of thermally conductive filler particles. TIM 174, 174' can be supplied in many physical forms, including (but not limited to): cure-in-place liquids, gels, thermal pads, flexible sheets, and adhesives, and/or combinations thereof, as representative examples. The polymer matrix can also take on different chemical compositions including (but not limited to): silicone, urethane, epoxy, and methacrylate, and/or combinations thereof, as representative examples. The thermally conductive filler particles can also take on various shapes and materials including (but not limited to): alumina, silver, copper, graphite, aluminum, and boron nitride, and/or combinations thereof, as a couple of representative examples. Alternatively, cooling plate 146 can be soldered or brazed to support beam 144 to make a strong thermal/structural connection. The thermal/structural joints between cooling plate 146, 146' and horizontal support beam 144, 144', respectively, causes the horizontal support beams 144, 144' to be cooled by the attached cooling plate 146, 146', respectively. This configuration allows for additional cooling of the underside of the battery cells (which are hidden behind structural side plate 150 in this figure). Hence, each battery cell 156 is effectively cooled on three sides.

Figure 10:
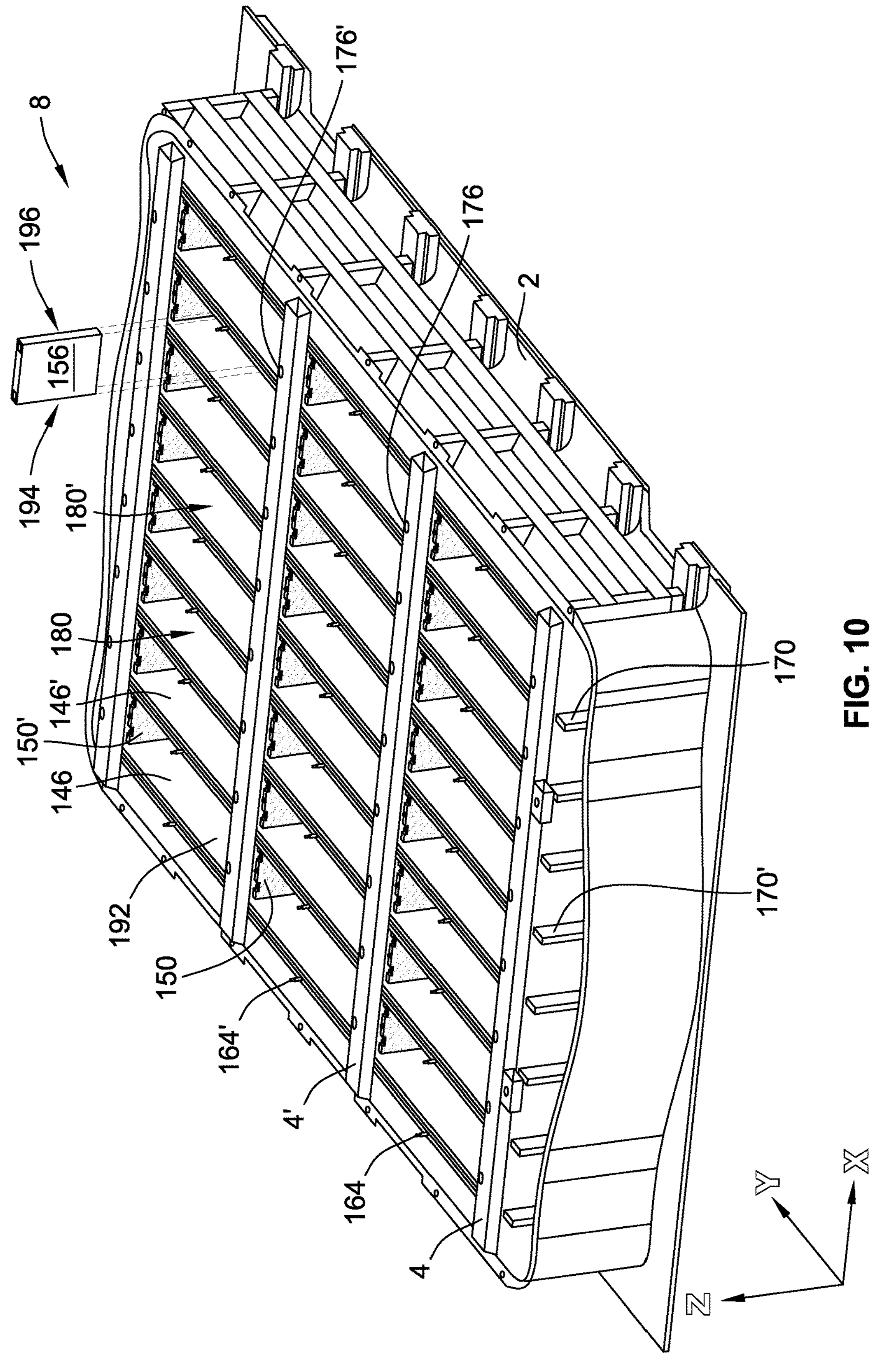
FIG. 10 shows a 3-D perspective view of an assembled complete set of representative cooling plates and structural elements of a representative battery pack, without showing any internal battery cells or battery cells, according to aspects of the present disclosure.

Continuing on with FIG. 4, structural side plate 150 is positioned in-between the pair of parallel cooling plates 146 and 146' at a plurality of locations (See FIG. 10 for additional details). Structural side plate 150 is attached to both left and right cooling plates 146 and 146' with a plurality of fasteners 166 (not shown, see FIG. 7). Structural side plate 150 is also attached to the bottom structural support plate 2 (i.e., tray 2) (see FIG. 3) of battery pack 8 with vertical bolt 152. Located on the underside of battery pack 8 are a plurality of gas vent apertures 154, 154', etc. that provide an open pathway for hot gases to be vented from battery pack 8 during an unlikely Thermal Runaway Propagation (TRP) event. Gas vent apertures 154, 154' can have an oval shape, rectangular shape, square shape, or circular shape, and/or combinations thereof. Gas vents apertures 154, 154' can be located in the open zone defined by a right edge of a first horizontal support beam 144, and also defined by a left edge of the second horizontal support beam 144'. A first layer of a Thermal Interface Material (TIM) 190 can be disposed in between a bottom side (not identified) of battery cell 156 and a first horizontal support beam 144; and a second layer of Thermal Interface Material (TIM) 190' can be disposed in between the bottom side (not identified) of battery cell 156 and a second horizontal support beam 144'.

Figure 5:
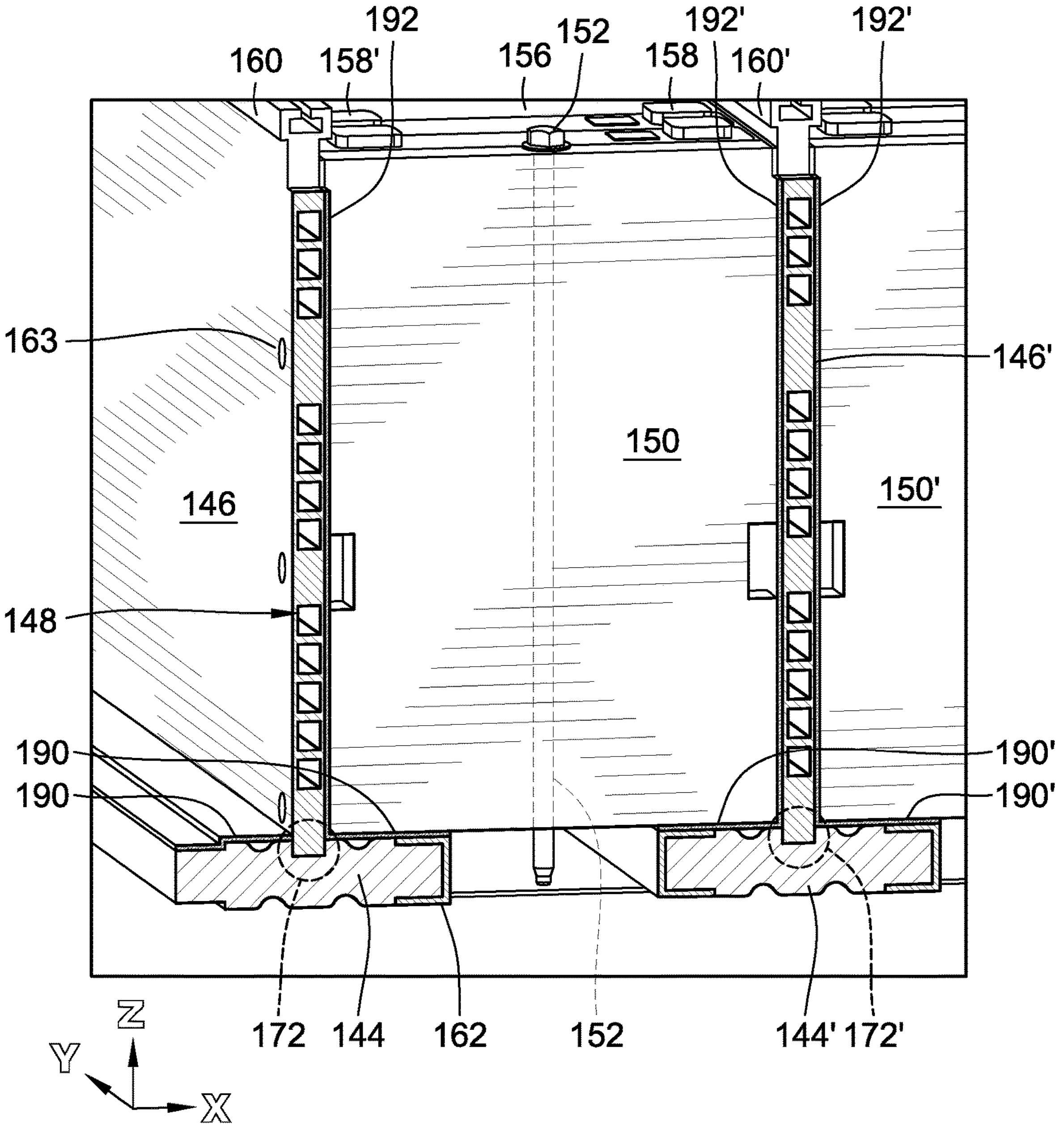
FIG. 5 shows a 3-D perspective view of an assembled pair of representative cooling plates and structural elements of a representative battery pack, according to aspects of the present disclosure.

FIG. 5 shows a 3-D perspective view of a pair of representative cooling plates and structural elements of a representative battery pack, according to aspects of the present disclosure. Cooling plate 146 comprises a plurality of parallel, internal cooling channels 148, 148', etc., which can have a rectangular, square, circular, or oval cross-sectional shape. Cooling plate 146 can be made of extruded aluminum or aluminum alloy. The bottom side 172 of cooling plate 146 can be embedded into a rectangular groove 173 in horizontal support beam 144 that runs along the bottom side of battery cell 156 in the "Y"-direction. The connection of cooling plate 146 to horizontal support beam 144 can be a mechanical interference fit, with or without using a Thermal Interface Material (TIM) disposed in-between cooling plate 146 and horizontal support beam 144. Alternatively, cooling plate 146 can be soldered or brazed to horizontal support beam 144. The cooling effect afforded by the attached cooling plate 146 is transferred down to the horizontal support beam 144, which contacts the bottom side (not shown) of battery cell 156. This dual-function configuration, comprising cooled horizontal support beams 144, 144', provides simultaneous structural support for the battery cell 156, as well as providing a three-sided cooling effect of the battery cell 156 (i.e., two sides of battery cell 156 are cooled by cooling plates 146, 146', and the third side (i.e., the bottom surface of battery cell 156) is cooled by cold, horizontal support beams 144 and 144'. A first layer of a Thermal Interface Material (TIM) 190 can be disposed in-between a bottom side (not identified) of battery cell 156 and a first horizontal support beam 144; and a second layer of Thermal Interface Material (TIM) 190' can be disposed in-between the bottom side (not identified) of battery cell 156 and a second horizontal support beam 144'. A third layer of a Thermal Interface Material (TIM) 192 can be disposed in-between the first cooling plate 146 and a front side 194 of battery cell 156; and a fourth layer of Thermal Interface Material (TIM) 192' can be disposed in between the second cooling plate 146' and a back side 196 of battery cell 156. The front side 194 of battery cell 156 is located opposite to the back side 196 of battery cell 156.

Continuing on with reference to FIG. 5, structural side plate 150 is oriented at 90° to the broad plane of cooling plates 146, 146', and side plate 150 is sandwiched in-between parallel cooling plates 146 and 146' at 90 degrees, and the resulting structure is attached with fasteners (e.g., bolts) that are inserted through three, evenly-spaced horizontal fastener holes 163, 163', and 163". No horizontal cooling channels are located at the vertical positions where the horizontal fastener holes 163, 163', and 163" are located (see, also, FIG. 7). Located on a top portion of cooling plates 146 and 146' are a pair of integral (e.g., extruded) horizontal structural channels 160, 160' that run along the length of cooling plate 146, 146', respectively, in the "Y"-direction. Each structural channel 160, 160' holds one or more vertical fasteners 164 (not shown, see FIG. 6), which are used to connect a structural beam 4, 4', 4" (not shown, See FIG. 3) that runs along the "X"-direction of battery pack 8. See FIGS. 3 and 10. Vertical bolt 152 securely attaches side support plate 150 to the bottom support plate 2 (not shown, see FIG. 3) of battery pack 8. Also shown in FIG. 5 is an example of a prismatic (e.g., rectangular) battery cell 156 with a pair of positive and negative electrodes 158, 158', respectively.

Figure 6:
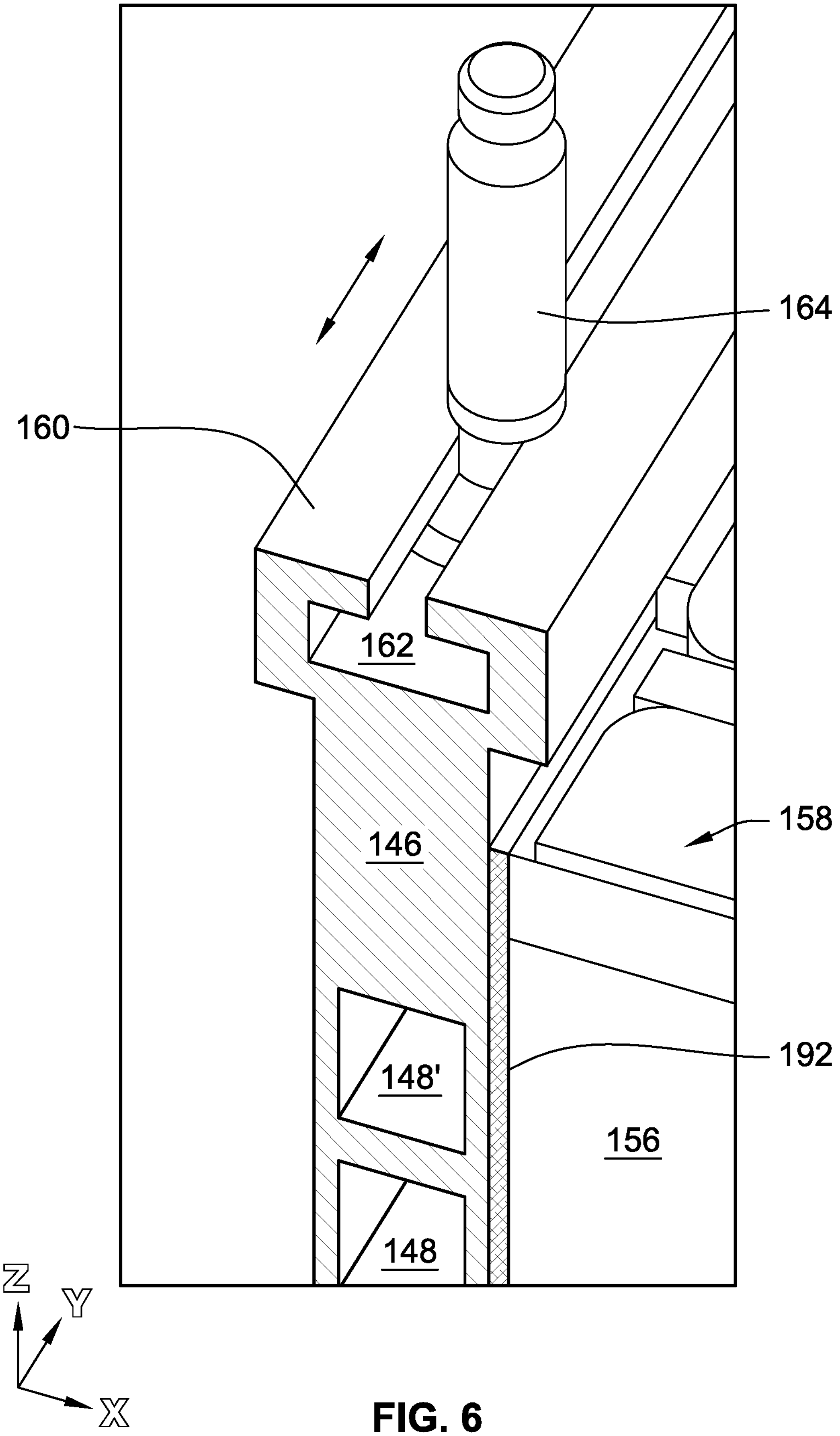
FIG. 6 shows a 3-D perspective cross-sectional view of an assembled representative cooling plate and structural elements of a representative battery pack, according to aspects of the present disclosure.

FIG. 6 shows a 3-D perspective cross-sectional view of an assembled representative cooling plate and structural elements of a representative battery pack, according to aspects of the present disclosure. Cooling plate 146 comprises a plurality of parallel, internal cooling channels 148, 148', etc., which can have a rectangular, square, circular, or oval cross-sectional shape, and/or combinations thereof. Cooling plate 146 can be made of, for example, extruded aluminum or aluminum alloy. Located on the top portion of each cooling plate 146 is an integral (e.g., co-extruded) structural channel 160 (with a recessed groove 162) that runs along the length of cooling plate 146 in the "Y"-direction. Structural channel 160 holds a slidable, vertical threaded fastener 164, which is used to connect a structural beam (not shown) that runs along the "X"-direction (see FIG. 10). Threaded fastener 164 has a circular or square re-entrant shape that allows it to slide along the entire length of channel 160 in the "Y"-direction. Channel 160 can be open at both ends to allow for easy insertion of the one or more threaded fasteners 164 into channel 160. A third layer of a Thermal Interface Material (TIM) 192 can be disposed in between the first cooling plate 146 and a front side 194 of battery cell 156.

Figure 7:
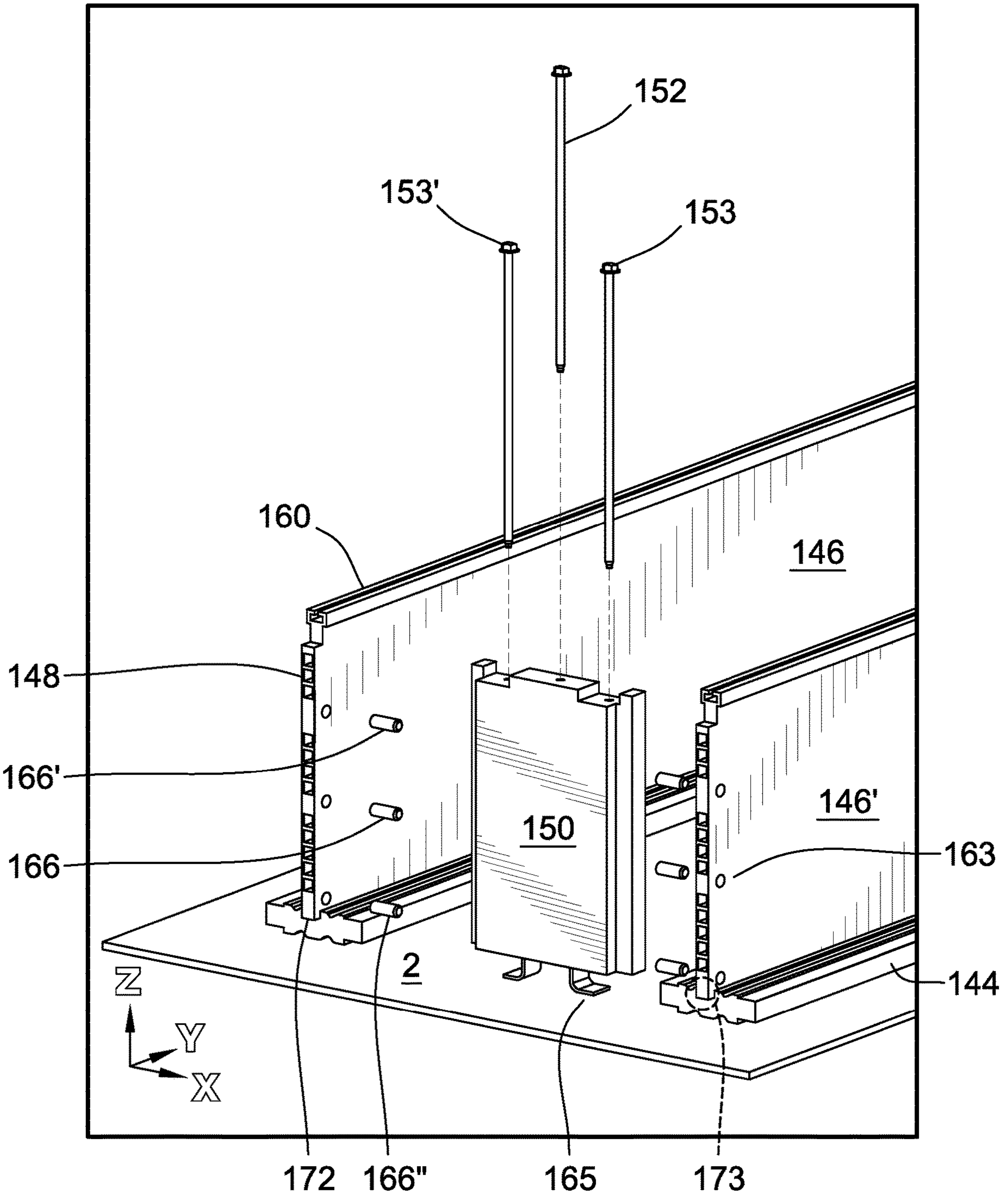
FIG. 7 shows a 3-D exploded perspective view of a pair of representative cooling plates and structural elements of a representative battery pack, according to aspects of the present disclosure.

FIG. 7 shows a 3-D, exploded perspective view of a pair of representative cooling plates and structural elements of a representative battery pack, according to aspects of the present disclosure. Cooling plates 146 and 146' each comprise a plurality of parallel, internal cooling channels 148, 148', etc., which can have a rectangular, square, circular, or oval cross-sectional shape, and/or combinations thereof. Cooling plate 146 can be made of, for example extruded aluminum or aluminum alloy. The bottom edge 172 of cooling plate 146 can be embedded into a rectangular groove 173 that runs along the length of horizontal support beam 144 to form a dual-function, thermal/structural joint that runs along the bottom side of battery pack 8 in the "Y"-direction. The connection of cooling plate 146 to horizontal support beam 144 can be a mechanical interference fit, with or without using a Thermal Interface Material (TIM) disposed inside the connected joint between cooling plate 146 and support beam 144. Alternatively, cooling plate 146 can be soldered or brazed to horizontal support beam 144 to make a good thermal/structural connection. At the bottom of structural side plate 150 is a U-shaped bracket 165.

Continuing on with FIG. 7, structural side plate 150 is oriented at 90 degrees to cooling plates 146 and 146', and structural side plate 150 is disposed in-between the pair of cooling plates 146 and 146'. Structural side plate 150 can be attached to the pair of cooling plates 146 and 146' with (for example, three) fasteners 166, 166', 166" that pass through horizontal holes 163, 163', and 163", respectively, in side plate 150. Structural side plate 150 can also be attached to the bottom support plate 2 of battery pack 8 with central vertical bolt 152. Structural side plate 150 can also be attached to the pair of horizontal support beams 144, 144' with a pair of vertical bolts 153, 153', respectively. The fastening means for joining the first cooling plate 146, the second cooling plate 146', the first structural side plate 150, and the second structural side plate 150' (not shown) together into a rectangular, box-like structure (i.e., sub-structure) can comprise, for example, a bolted and/or pinned connection. Alternatively, the fastening means can comprise a brazed connection.

Figure 8:
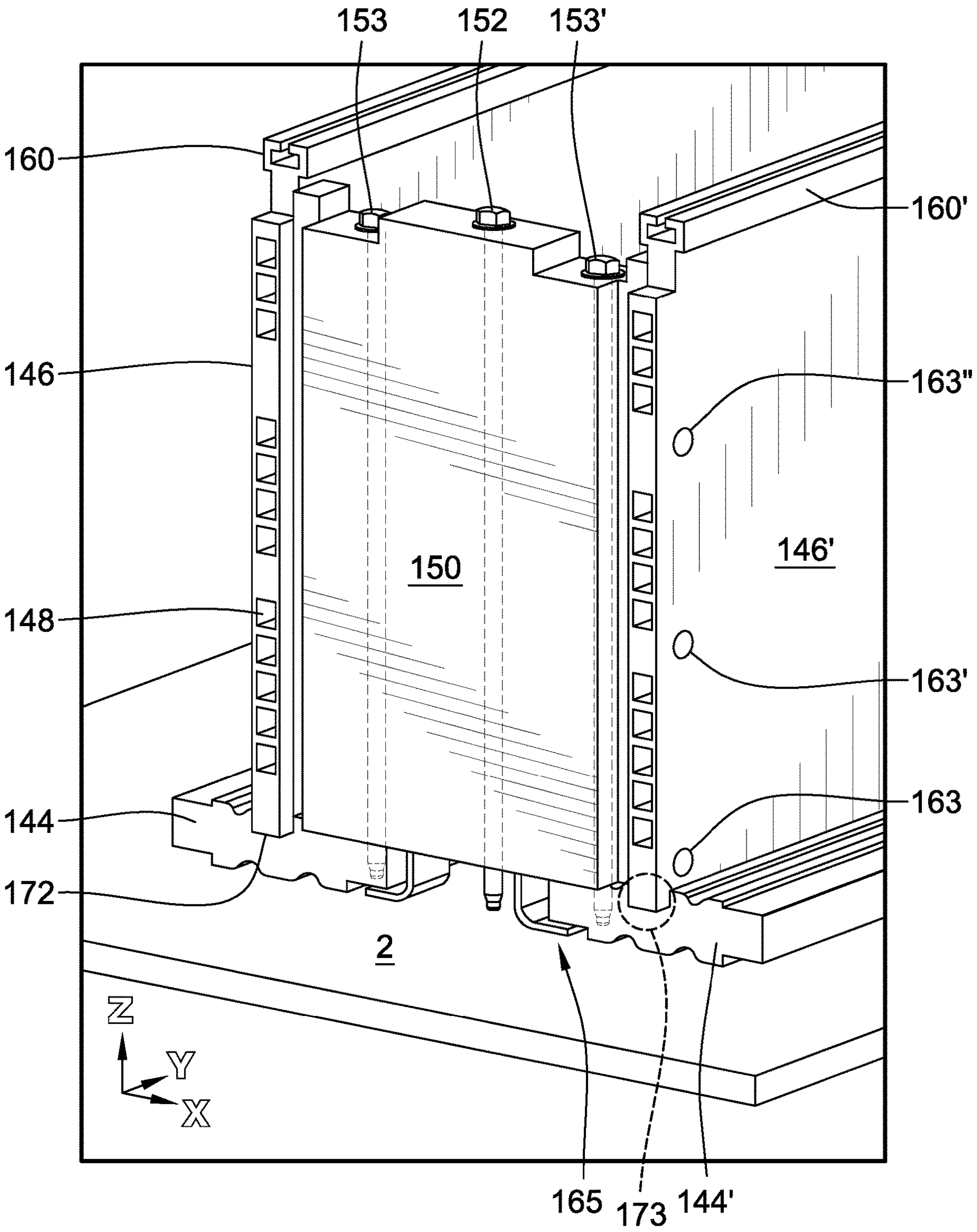
FIG. 8 shows a 3-D perspective view of an assembled pair of representative cooling plates and structural elements of a representative battery pack, according to aspects of the present disclosure.

FIG. 8 shows a 3-D perspective view of an assembled pair of representative cooling plates and structural elements of a representative battery pack, according to aspects of the present disclosure. Cooling plate 146 comprises a plurality of parallel, internal cooling channels 148, 148', etc., which can have a rectangular, square, circular, or oval cross-sectional shape, and/or combinations thereof. Cooling plate 146 can be made of, for example, extruded aluminum or aluminum alloy. The bottom edge 172 of cooling plate 146 can be securely embedded into a rectangular groove 173 of a horizontal support beam 144 that runs along the bottom side of battery pack 8 in the "Y-direction. The connection of cooling plate 146 to horizontal support beam 144 can be a mechanical interference fit, with or without the use of a Thermal Interface Material (TIM) disposed inside the connected joint between cooling plate 146 and support beam 144. Alternatively, cooling plate 146 can be soldered or brazed to horizontal support beam 144 to make an excellent thermal/structural connection.

Continuing on with FIG. 8, structural side plate 150 is oriented at 90 degrees to the pair of parallel cooling plates 146 and 146'. Structural side plate 150 is attached to the pair of cooling plates 146 and 146' with fasteners 166 (e.g., bolts or pins) that pass through horizontal holes 163, 163', and 163". Structural side plate 150 is also attached to the bottom plate 2 of battery pack 8 with central vertical bolt 152. Structural side plate 150 is also attached to both horizontal support beams 144, 144' of battery pack 8 with vertical bolts 153, 153', respectively.

Figure 9:
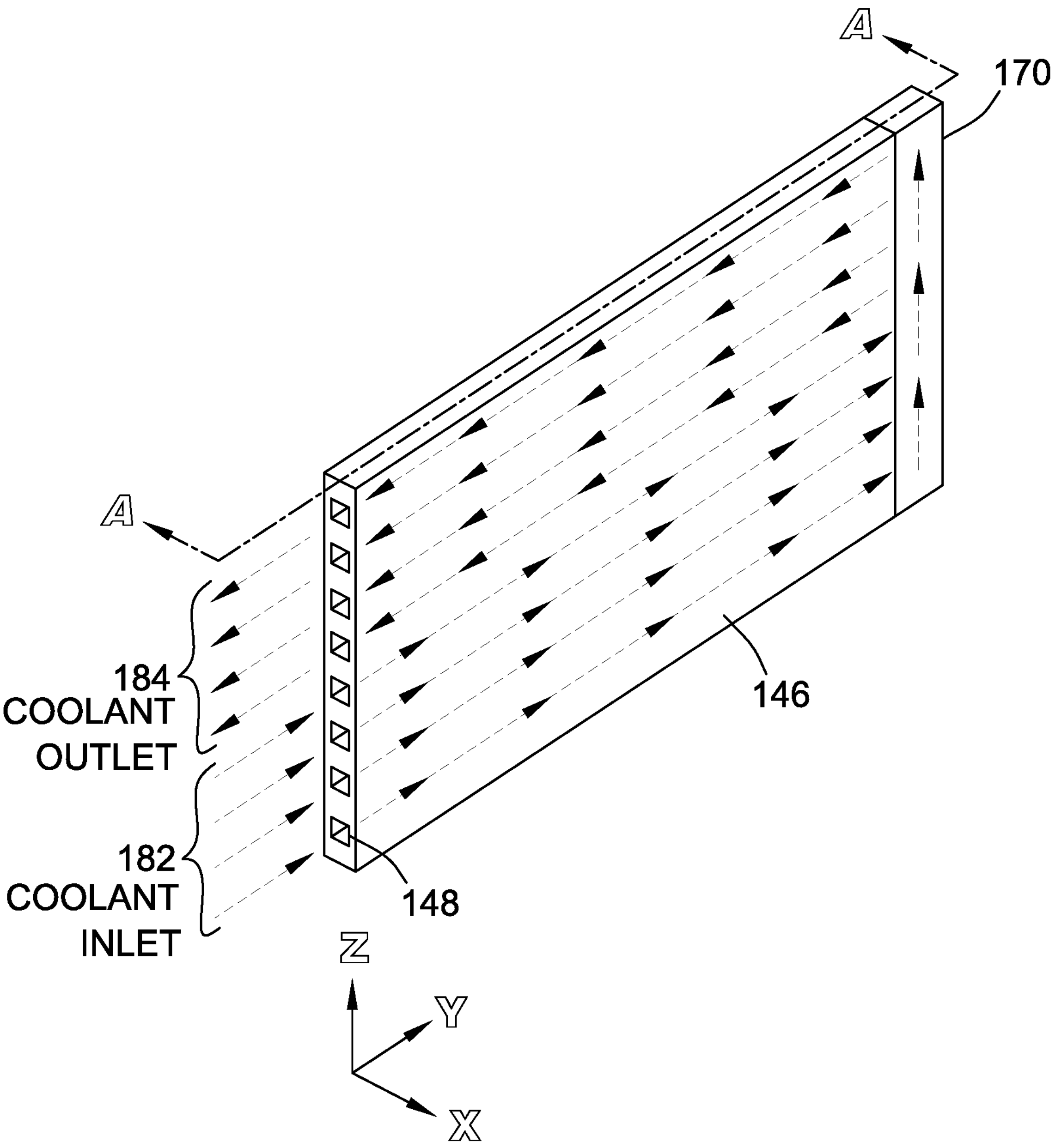
FIG. 9 shows a 3-D perspective view of a representative cooling plate with a coolant manifold, according to aspects of the present disclosure.

FIG. 9 shows a 3-D perspective view of a representative cooling plate and attached coolant manifold, according to aspects of the present disclosure. Cooling plate 146 comprises a plurality of parallel, internal cooling channels 148, 148', etc., which can have a rectangular, square, circular, or oval cross-sectional shape, and/or combinations thereof. Cooling plate 146 can be made of, for example, extruded aluminum or aluminum alloy. Inlet coolant 182 (which can be, for example, Dexcool™ antifreeze coolant in a possible implementation) enters a sub-set of internal cooling channels 148 that are located in the lower half of cooling plate 146, then travels along the internal cooling channels 148 in the "Y"-direction, whereupon they enter attached the lower half of manifold 170 and then flows inside manifold 170 in the vertical direction along the "Z"-direction. The coolant flow then exits the upper half of manifold 170 and flows in the opposite direction (negative "Y"-direction) through the upper half of cooling plate 146 toward the coolant outlet 184. This innovative configuration of coolant flow direction helps to guarantee that no air bubbles are present in the coolant system when coolant is initially added to cooling plates 146, 146'.

FIG. 10 shows a 3-D perspective view of an assembled, complete set of representative cooling plates and structural elements of a representative battery pack, without the internal battery cells or battery cells, according to aspects of the present disclosure. The dual-function, thermal/structural components that make up battery pack 8 comprise an integrated, modular matrix of box-like structures that each have open cavities 180, 180', etc. that are disposed in between the thermal/structural components. The open cavities 180, 180', etc. contain and hold a plurality of battery cells 156, 156', etc. that are stacked side-by-side (there can be, for example, 10-20 individual battery cells 156, 156', etc. located in a single open vertical cavity 180). Battery pack 8 is securely attached to a bottom support plate 2 with vertical bolts (see FIG. 3). In this representative example, nine parallel cooling plates 146, 146', etc. span across the full width of battery pack 8 in the "Y"-direction. Thirty-two structural side plates 150, 150', etc. are disposed at 90° in-between pairs of parallel cooling plates 146, 146', and are oriented along the "X"-direction. Each structural side plate 150, 150', etc. is individually attached (e.g., bolted with a vertical bolt 152) to bottom support plate 2 (see FIGS. 7 and 8). In this example, there are seven parallel structural channels 4, 4', etc. that run along the "X"-direction and substantially span the entire width of battery pack 8. Access holes 176, 176', etc. are provided in the top of these parallel structural channels 4, 4', 4", respectively, for inserting vertical bolts 152, 152' (not shown, see FIG. 7 and FIG. 8) that attach side plates 150, 150' to bottom support plate 2.

Also shown in FIG. 10 are a plurality (e.g., thirty-six) of movable (slidable) vertical fasteners 164, 164', etc. that can slide along a horizontal groove 162 in recessed channel 160 (see FIG. 6), which is disposed on a top portion of cooling plate 146, and also which runs in the "Y"-direction. These slidable vertical fasteners 164, 164', etc. are used to attach structural channels 4, 4', etc. to the cooling plates 146, 146, etc. Box-like, open battery storage cavity 180, whose extent is defined by a pair of parallel cooling plates 146, 146' on two sides, and a pair of structural side plates 150, 150' on the other two sides, comprises an open rectangular cavity 180 that holds, for example, twenty prismatic battery cells 156, 156', etc., stacked side-by-side within the dual-function structure. A third layer of a Thermal Interface Material (TIM) 192 can be disposed in between first cooling plate 146 and a front side 194 of battery cell 156. Coolant manifolds 170, 170' can be seen in FIG. 10.

Figure 11:
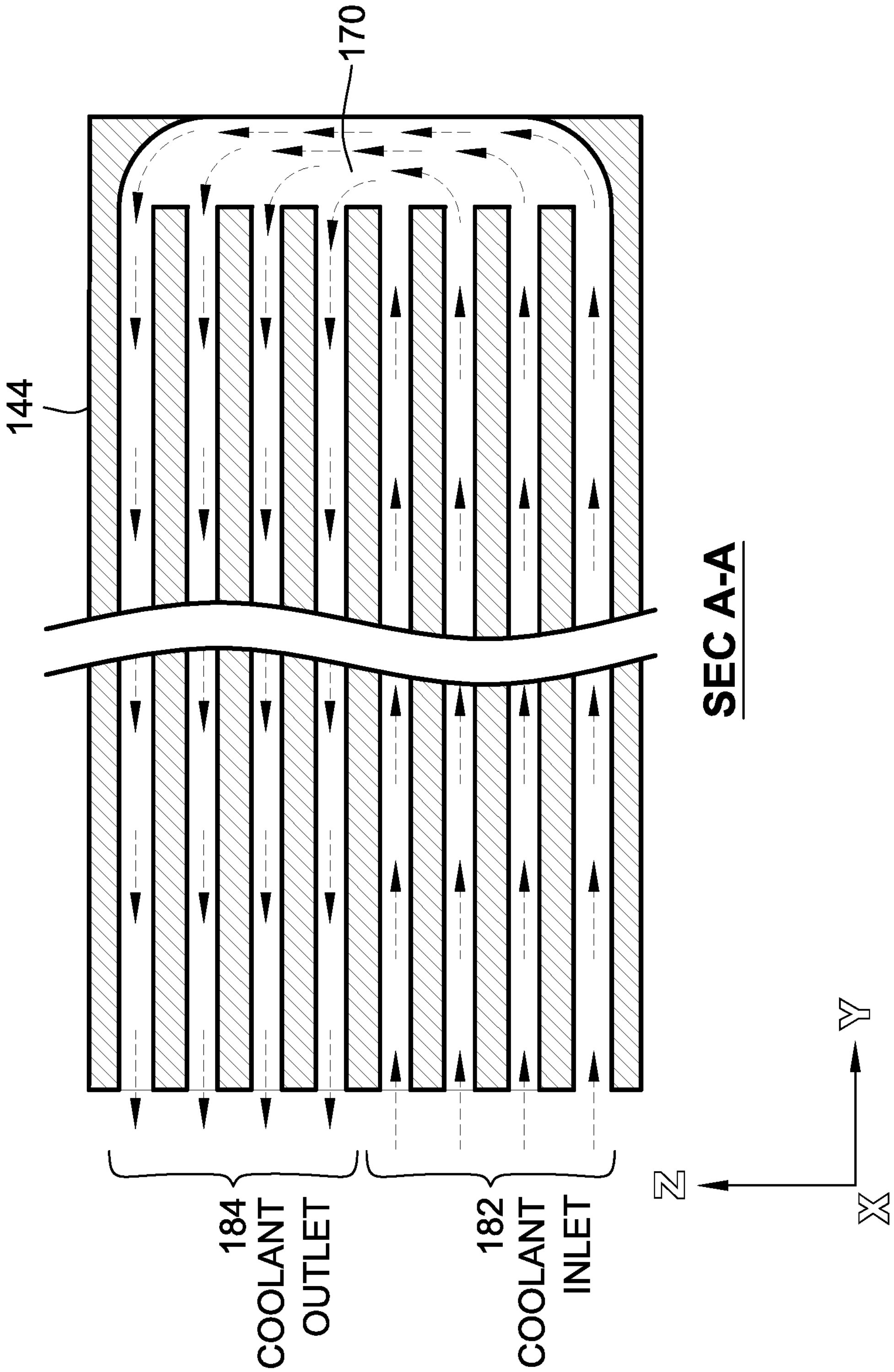
FIG. 11 shows a cross-sectional elevation view of a representative cooling plate and attached coolant manifold, showing the coolant flow paths, according to aspects of the present disclosure.

FIG. 11 shows a cross-sectional, elevation view of a representative cooling plate with integral coolant manifold, showing the innovative coolant flow paths, according to aspects of the present disclosure. Coolant 182 (which can be, for example, Dexcool™ antifreeze coolant, in one example) enters a lower sub-set of the internal cooling channels 148 that are located in the lower ½ of cooling plate 146, then travels in the internal cooling channels 148 along the lower ½ of cooling plate 146 in the "Y"-direction, whereupon they enter manifold 170 and then flow in the vertical direction along the "Z"-direction. The coolant flow then turns 90° inside of manifold 170 and then flows in the opposite direction (negative "Y"-direction) through the upper ½ of cooling plate 146 toward the coolant outlet 184. This innovative configuration of coolant flow helps to guarantee that no air bubbles are present in the coolant system when coolant is initially added to a cooling plate 146.

The detailed description and the drawings or figures are supportive and descriptive of the present teachings, but the scope of the present teachings is defined solely by the claims. While some of the best modes and other examples for carrying out the present teachings have been described in detail, various alternative designs and examples exist for practicing the present teachings defined in the appended claims.

What is claimed is:

1. A dual-function structure, comprising:

a first cooling plate comprising a first plurality of internal coolant channels;

a second cooling plate comprising a second plurality of internal coolant channels;

a first structural side plate that is structurally attached to both the first and second cooling plates at proximal ends of the first and second cooling plates; and a second structural side plate that is structurally attached to both the first and second cooling plates at distal ends of the first and second cooling plates;

wherein the first cooling plate simultaneously thermally cools and structurally supports a first side of a battery cell;

wherein the second cooling plate simultaneously thermally cools and structurally supports a second side of the battery cell; and wherein the first side of the battery cell is located opposite to the second side of the battery cell; and wherein the dual-function structure further comprises:

a first coolant manifold that is fluidically coupled to a distal end of the first cooling plate; and a second coolant manifold that is fluidically coupled to a distal end of the second cooling plate;

wherein the first cooling plate and the first coolant manifold are configured so that coolant initially flows horizontally inside a lower portion of the first cooling plate's internal flow channels towards the first coolant manifold, then turns and flows vertically upwards inside the first coolant manifold, at which point the coolant flow reverses direction and flows horizontally away from first coolant manifold along an upper portion of the first cooling plate towards a first coolant exit; and wherein the second cooling plate and the second coolant manifold are configured so that coolant initially flows horizontally inside a lower portion of the second cooling plate's internal flow channels towards the second coolant manifold, then turns and flows vertically upwards inside the second coolant manifold, at which point the coolant flow reverses direction and flows horizontally away from second coolant manifold along an upper portion of the second cooling plate towards a second coolant exit.

2. The dual-function structure of claim 1, further comprising:

a battery cell disposed inside of the dual-function structure, the battery cell comprising a front side and an opposing back side;

a first layer of a thermal interface material (TIM) that is disposed in between the first cooling plate and the front side of the battery cell; and a second layer of a thermal interface material (TIM) that is disposed in between the second cooling plate and the back side of the battery cell.

3. The dual-function structure of claim 1, wherein the first structural side plate is oriented at 90 degrees to the first cooling plate;

wherein the second structural side plate is oriented at 90 degrees to the second cooling plate; and wherein the first structural side plate is oriented parallel to the second structural side plate.

4. The dual-function structure of claim 1, further comprising:

a first horizontal support beam; and a second horizontal support beam, which is oriented parallel to the first horizontal support beam, wherein the first horizontal support beam is simultaneously thermally connected and structurally attached to a first bottom side of the first cooling plate;

wherein the second horizontal support beam is simultaneously thermally connected and structurally attached to a second bottom side of the second cooling plate; and wherein the first and second horizontal support beams structurally support and thermally cool a battery cell on a third, bottom side of the battery cell.

5. The dual-function structure of claim 4, further comprising:

a first combined thermal/structural joint made between the first cooling plate and the first horizontal support beam;

a second combined thermal/structural joint made between the second cooling plate and the second horizontal support beam;

a first layer of a thermal interface material (TIM) disposed inside the first combined thermal/structural joint; and a second layer of a thermal interface material (TIM) disposed inside the second combined thermal/structural joint.

6. The dual-function structure of claim 4, wherein the first structural side plate is structurally attached to both the first horizontal support beam and the second horizontal support beam; and wherein the second structural side plate is structurally attached to both the first horizontal support beam and the second horizontal support beam.

7. The dual-function structure of claim 1, wherein the first and second cooling plates are made of an extruded aluminum alloy;

wherein the first plurality of internal cooling channels is oriented parallel to each other;

wherein the second plurality of internal cooling channels is oriented parallel to each other; and wherein the first and second plurality of internal cooling channels have a rectangular cross-sectional shape.

8. The dual-function structure of claim 1, further comprising:

a first integral horizontal channel disposed on a top portion of the first cooling plate; and a second integral horizontal channel disposed on a top portion of the second cooling plate;

wherein the first integral horizontal channel comprises a first recessed horizontal groove configured to hold a first vertical fastener;

wherein the second integral horizontal channel comprises a second recessed horizontal groove configured to hold a second vertical fastener;

wherein the first integral horizontal channel is open at both ends of the first integral horizontal channel; and wherein the second integral horizontal channel is open at both ends of the second integral horizontal channel.

9. The dual-function structure of claim 4, further comprising:

a battery cell disposed inside of the dual-function structure, wherein the battery cell comprises a bottom side;

a third layer of a thermal interface material (TIM) that is disposed in between the bottom side of the battery cell and the first horizontal support beam; and a fourth layer of a thermal interface material (TIM) that is disposed in between the bottom side of the battery cell and the second horizontal support beam.

10. The dual-function structure of claim 9, further comprising:

a first slidable vertical fastener disposed inside of the first recessed horizontal groove; and a second slidable vertical fastener disposed inside of the second recessed horizontal groove.

11. The dual-function structure of claim 1, comprising:

a first cooling plate comprising a first plurality of internal coolant channels;

a second cooling plate comprising a second plurality of internal coolant channels;

a first structural side plate that is structurally attached to both the first and second cooling plates at proximal ends of the first and second cooling plates;

a second structural side plate that is structurally attached to both the first and second cooling plates at distal ends of the first and second cooling plates;

a plurality of fasteners that structurally join the first cooling plate, the second cooling plate, the first structural side plate, and the second structural side plate together into a rectangular, box-like structure; and a battery cell;

wherein the first cooling plate simultaneously thermally cools and structurally supports a first side of the battery cell;

wherein the second cooling plate simultaneously thermally cools and structurally supports a second side of the battery cell;

wherein the first side of the battery cell is located opposite to the second side of the battery cell;

wherein the battery cell is disposed inside of a rectangular opening in the dual-function structure that is defined on four sides by: (1) the first cooling plate, (2) the first structural side plate, (3) the second cooling plate, and (4) the second structural side plate; and wherein the dual-function structure is attached to a bottom support plate that is disposed underneath a battery pack.

12. The dual-function structure of claim 11, further comprising:

a first horizontal support beam, a second horizontal support beam, which is oriented parallel to the first horizontal support beam;

wherein the first horizontal support beam is simultaneously thermally connected and structurally attached to a first bottom side of the first cooling plate; and wherein the second horizontal support beam is simultaneously thermally connected and structurally attached to a second bottom side of the second cooling plate;

wherein the first horizontal support beam thermally cools and structurally supports the battery cell on a first portion of a first bottom side of the battery cell; and wherein the second horizontal support beam thermally cools and structurally supports the battery cell on a second portion of a second bottom side of the battery cell;

thereby providing simultaneous three-sided structural support and three-sided thermal cooling of the battery cell.

13. The dual-function structure of claim 12, further comprising:

a first combined thermal/structural joint made between the first cooling plate and the first horizontal support beam;

a second combined thermal/structural joint made between the second cooling plate and the second horizontal support beam;

a first layer of a thermal interface material (TIM) that is disposed inside the first combined thermal/structural joint; and a second layer of a thermal interface material (TIM) that is disposed inside the second combined thermal/structural joint.

14. The dual-function structure of claim 12, wherein the first structural side plate is structurally attached to both the first horizontal support beam and the second horizontal support beam; and wherein the second structural side plate is structurally attached to both the first horizontal support beam and the second horizontal support beam.

15. The dual-function structure of claim 11, wherein the first and second cooling plates are made of an extruded aluminum alloy;

wherein the first plurality of internal cooling channels is oriented parallel to each other;

wherein the second plurality of internal cooling channels is oriented parallel to each other; and wherein the first and second plurality of internal cooling channels have a rectangular cross-sectional shape.

16. The dual-function structure of claim 1, comprising:

a first cooling plate comprising a first plurality of internal coolant channels;

a second cooling plate comprising a second plurality of internal coolant channels;

a first structural side plate that is structurally attached to both the first and second cooling plates at proximal ends of the first and second cooling plates;

a second structural side plate that is structurally attached to both the first and second cooling plates at distal ends of the first and second cooling plates;

a plurality of fasteners that structurally join the first cooling plate, the second cooling plate, the first structural side plate, and the second structural side plate together into a rectangular, box-like structure;

a first horizontal support beam;

a second horizontal support beam, which is oriented parallel to the first horizontal support beam; and a battery cell that is disposed inside of a rectangular open cavity in the dual-function structure;

wherein the first cooling plate simultaneously thermally cools and structurally supports the battery cell on a first side of the battery cell;

wherein the second cooling plate simultaneously thermally cools and structurally supports the battery cell on a second side of the battery cell;

wherein the first side of the battery cell is located opposite to the second side of the battery cell;

wherein the first horizontal support beam is simultaneously thermally connected and structurally attached to a first bottom side of the first cooling plate;

wherein the second horizontal support beam is simultaneously thermally connected and structurally attached to a second bottom side of the second cooling plate;

wherein the first and second horizontal support beams simultaneously structurally support and thermally cool the battery cell on a third, bottom side of the battery cell;

wherein the first structural side plate is oriented at 90 degrees to the first cooling plate;

wherein the second structural side plate is oriented at 90 degrees to the second cooling plate;

wherein the first structural side plate is oriented parallel to the second structural side plate;

wherein the first structural side plate is structurally attached to proximal ends of both the first horizontal support beam and the second horizontal support beam;

wherein the first structural side plate is attached to proximal ends of both the first horizontal support beam and the second horizontal support beam;

wherein the second structural side plate is attached to distal ends of both the first horizontal support beam and the second horizontal support beam;

wherein the first horizontal support beam thermally cools the battery cell on a first portion of a bottom side of the battery cell; and wherein the second horizontal support beam thermally cools the battery cell on a second portion of a bottom side of the battery cell;

thereby providing simultaneous three-sided structural support and thermal cooling of the battery cell.

17. The dual-function structure of claim 16, wherein the battery cell is disposed in a rectangular open cavity in the dual-function structure that is defined on four sides by: (1) the first cooling plate, (2) the first structural side plate, (3) the second cooling plate, and (4) the second structural side plate.

18. The dual-function structure of claim 16, further comprising:

a first combined thermal/structural joint made between the first cooling plate and the first horizontal support beam;

a second combined thermal/structural joint made between the second cooling plate and the second horizontal support beam;

a first layer of a thermal interface material (TIM) that is disposed inside the first combined thermal/structural joint; and a second layer of a thermal interface material (TIM) that is disposed inside the second combined thermal/structural joint.

19. The dual-function structure of claim 16, further comprising:

a first integral horizontal channel disposed on a first top portion of the first cooling plate;

a second integral horizontal channel disposed on a second top portion of the second cooling plate;

a first horizontal recessed groove disposed in the first integral horizontal channel, for holding a first vertical fastener; and a second horizontal recessed groove disposed in the second integral horizontal channel, for holding a second vertical fastener;

a first slidable vertical fastener that is disposed in the first horizontal recessed groove;

a second slidable vertical fastener that is disposed in the second horizontal recessed groove; and a hollow structural channel that is structurally attached to both the first and the second slidable vertical fasteners;

wherein the hollow structural channel is disposed on a top portion of both the first cooling plate and the second cooling plates;

wherein the hollow structural channel is oriented at 90 degrees to both the first cooling plate and the second cooling plate;

wherein the first integral horizontal channel is open at proximal and distal ends of the first integral horizontal channel; and wherein the second integral horizontal channel is open at proximal and distal ends of the second integral horizontal channel.

* * * * *